United States Patent [19]

Keller

[11] Patent Number: 4,685,469

[45] Date of Patent: Aug. 11, 1987

[54] PIEZORESISTIVE PRESSURE MEASURING CELL

[76] Inventor: Hans W. Keller, Burgstrasse 142, CH-8404 Winterthur, Switzerland

[21] Appl. No.: 701,786

[22] Filed: Feb. 14, 1985

[30] Foreign Application Priority Data

Mar. 9, 1984 [DE] Fed. Rep. of Germany ... 8407322[U]

[51] Int. Cl.⁴ .................................................. A61B 5/02
[52] U.S. Cl. .................................... 128/675; 128/748; 73/727
[58] Field of Search ............................. 128/672–673, 128/675, 748; 73/725–727, 721; 338/312, 314

[56] References Cited

U.S. PATENT DOCUMENTS

| | | | |
|---|---|---|---|
| 3,294,988 | 12/1966 | Packard | 128/675 X |
| 3,710,781 | 1/1973 | Huthcins et al. | 73/721 X |
| 3,831,588 | 8/1974 | Rindner | 128/675 |
| 3,918,019 | 11/1975 | Nunn | 73/726 X |
| 3,946,724 | 3/1976 | La Balme | 128/675 X |
| 3,968,466 | 7/1976 | Nakamura et al. | 73/727 X |
| 4,023,562 | 5/1977 | Hynecek et al. | 73/727 X |
| 4,141,253 | 2/1979 | Whitehead, Jr. | 73/727 |
| 4,191,193 | 3/1980 | Seo | 128/675 |
| 4,274,423 | 6/1981 | Mizuno et al. | 128/675 |
| 4,320,664 | 3/1982 | Rehn et al. | 73/727 X |
| 4,416,156 | 11/1983 | Demark et al. | 73/727 |
| 4,456,013 | 6/1984 | DeRossi et al. | 128/675 |
| 4,459,855 | 7/1984 | Yamagami | 73/727 |
| 4,554,927 | 11/1985 | Fussell | 128/673 X |
| 4,574,640 | 3/1986 | Krechmery | 73/721 |

FOREIGN PATENT DOCUMENTS 0133714  1/1979  Fed. Rep. of Germany ........ 73/726

Primary Examiner—Kyle L. Howell
Assistant Examiner—Angela D. Sykes
Attorney, Agent, or Firm—Orrin M. Haugen; Thomas J. Nikolai; Frederick W. Niebuhr

[57] ABSTRACT

A piezoresistive pressure measuring cell having a measuring membrane or diaphragm provided with resistance elements and with conductors extending from contact points on the resistance element to the measuring membrane, and wherein the connections between the pressure measuring cell and external components is accomplished through utilization of flexible circuitry.

24 Claims, 11 Drawing Figures

4,685,469

PIEZORESISTIVE PRESSURE MEASURING CELL

BACKGROUND OF THE INVENTION

The invention concerns a piezoresistive measuring cell having a measuring membrane or diaphragm provided with resistance elements and with conductors extending from contact points on the resistance element to the measuring membrane.

A pressure measuring element with a pressure measuring cell of this type has already been disclosed in German Pat. specification No. 26 30 640. This previously known pressure measuring element is disposed in a transmitting membrane or diaphragm housing in either cylindrical or essentially cylinder-like form, and with the housing being closed off at its top face side by a transmitting diaphragm. Installed below the transmitting diaphragm with resistances provided on its top side is the reference pressure measuring cell. The referenced cell is attached to a discoid glass feedthrough base through which run some base pins with the base pins extending in the axial direction next to the pressure measuring cell.

On their side facing toward the diaphragm, the base or socket pins are coupled to the resistance on the pressure measuring cell by means of connecting wires. In order to apply these features or principles for pressure measuring cells suited for absolute as well as for differential pressure measurements for a wide variety of ranges, it is, however, necessary to completely manufacture the pressure measuring element, including the base with the glass feedthroughs for the base pins and the connecting wires (which generally consist of gold). This arrangement is then delivered to original equipment manufactures who then may build this pressure measuring element into a membrane or diaphragm housing, in accordance with the specific objectives of the device. Soldering of the bonding wires requires cost-intensive, precision machines whose procurement price can cost many thousands of dollars.

SUMMARY OF THE INVENTION

The initial objective of the present invention is to procure a piezoresistive pressure measuring cell which, with the simplest of construction, can be applied universally and in random fashion, by original equipment manufacturers of pressure transducers. More importantly, and according to the requirements, the present invention additionally permits a miniature, in particular ultra flat, design. The objectives in accordance with the invention are set forth in the appended claims.

First, the pressure measuring cell in accordance with the invention need not necessarily be connected with a base which, according to the state of the art, is provided with glass feedthroughs for accommodating gold bond wires. This normal stiff connection and arrangement of the gold bond wires in accordance with the present state of the art actually became necessary since the further processing steps with the connection of this type of wire was not capable of being carried out without associated special machines. Secondly, a bending stress on the gold wires may have contributed to a breaking off at the connection points. The use of the pressure measuring cell in accordance with the invention may be accommodated in the same manner, without problems, in the most varied areas of application. In accordance with the invention the conductors leading away from the measuring membrane at the connection points are constructed on plastic foil material. At one end of the section, the connecting points of the resistances on the measuring cell are coupled to the connecting points on the foil material via contact protuberances. Electrical contact can then be undertaken in accordance with known processes. By using this type of elastic foil material, the pressure measuring cell, with the corresponding connecting lines in firm contact, can be manufactured in the simplest fashion, shipped and used by original equipment manufacturers in accordance with their field of activity.

One feature which has been favorably demonstrated is wherein the conductors are etched out on a copper foil laminated onto the plastic section of film.

In an advantageous embodiment according to one of the claims, provision may be made for forming on the end of the section of foil material opposite to the pressure measuring cell, contact eyes for soldering. In so doing, the contact eyes can be arranged randomly from one another so that when these pressure measuring cells are installed in pressure value transmitters, additional conductors corresponding to the requirements can be soldered, using usual procedures without encountering problems.

To provide the required interval between the contact eyes provided for in accordance with a further development according to one of the claims is that the plastic foil section of material be formed, for example, in a nodular shape with a tapered center section in top plan view. Other arbitrary forms are, however, just as possible.

Simple mounting of these pressure measuring cells in correspondence with a specifically configured pressure sensor is possible, in a preferred fashion, in a further development according to one of the claims due to the fact that the plastic foil material withstands temperatures up to at least 300° C., preferentially up to at least 400° C. Therefore, with soldering temperatures of about 180° C., the foil and/or film material will not be damaged.

In a particularly preferred form of embodiment according to one of the claims, it is further foreseen that there be provided, between the plastic foil material displaying the conductors and the measuring diaphragm, sealing lips disposed about the connecting points of the resistances on the measuring membrane. Through means of this specific embodiment, the pressure measuring cell in accordance with the invention can also be used in a conductive media without any further shielding membrane since, through this means, a short circuit in the pressurized fluid between the different connecting points of the resistances on the measuring membrane is prevented. In a further development according to the same claim, the sealing lips may be sprayed on the film, for example in form of O-rings about the connecting points of the resistances, or, in accordance with other claims commonly about several connecting points.

The thickness of the sealing lips is preferably less than 0.4 mm.

The piezoresistive pressure measuring cell has been demonstrated to be especially favorable also in the case of inclusion in a catheter housing for invasive blood pressure measurement. Here, according to one of the claims, the catheter housing is provided with a window, which through means of the pressure measuring cell having a box-shaped structure is sealed over its foot base. In this embodiment, the pressure measuring cell with the plastic foil material and the conductors disposed thereupon needs merely to be commonly inserted into the catheter housing via the introduction opening and appropriately anchored. Here, connection of the catheter is likewise done easily by prior soldering of the conductors to the contact eyes on the plastic foil material.

In a particularly preferred form of embodiment of the invention according to certain of the claims, the pressure measuring cell is built into a housing in floating fashion. This simplifies not only the entire structure of a pressure measuring element, but it becomes possible in this manner to achieve, above all, an ultra flat method of construction. Above all, in that form of embodiment the ends of the base pins in the region corresponding to the contact eyes are pushed through the section of film and are soldered on the same side of the section of film and/or of the so-called section of foil material on which the measuring membrane of the pressure measuring cell makes contact.

In one modified form of embodiment, it is also possible to obtain a pressure measuring element with a particularly small diameter by bending the foil section of the connection area to which the base pins are soldered, upwardly away from the base, for example by 90°, so that the pressure measuring cell is positioned with a measuring membrane lying perpendicularly to the base as shown at 71.

Finally, further advantages are also obtained due to the fact that the pressure measuring element, with an inner pressure space filled with a pressure medium, for example oil, is pressure welded, for which purpose is employed a stepped base provided with a circumscribing ring of section.

Further advantages, particular features of the invention are obtained from the following with the aid of examples of embodiment illustrated by drawings. Shown in particular here:

DESCRIPTION OF THE PREFERRED EMBODIMENT

Figure 1:
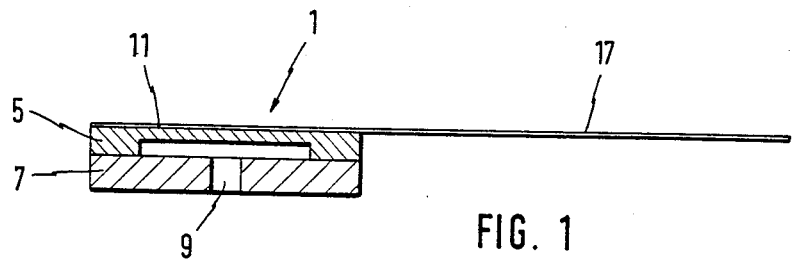
FIGS. 1 and 2 are one example of embodiment of a pressure measuring cell in an axial cross-section and in a top plan view.

Taken into account in the following will be FIGS. 1 and 2 in which is shown a pressure measuring cell 1 on top side of which are placed, in manner known per se, piezoresistive resistances 3, for example by vapor deposition. The box-shaped pressure measuring cell 1 is here attached, along its base foot 5, through its underside, to an underlying base plate and/or substrate 7, for example by means of a suitable gluing and adhesive agent that is not shown in any further detail. In place of the gluing and adhesive agent, it is also possible here to use a plastic substance capable of being biaxially stressed in accordance with European patent specification EP-OS 80 100 603 and corresponding U.S. Pat. No. 4,373,397.

In the example of embodiment shown, base 7 is displayed having the same outside diameter as the box-shaped pressure measuring cell 1. Furthermore, it is possible to form yet another hole 9 in the base plate 7 in order to also use the pressure measuring cell as a differential pressure meter.

Figure 2:
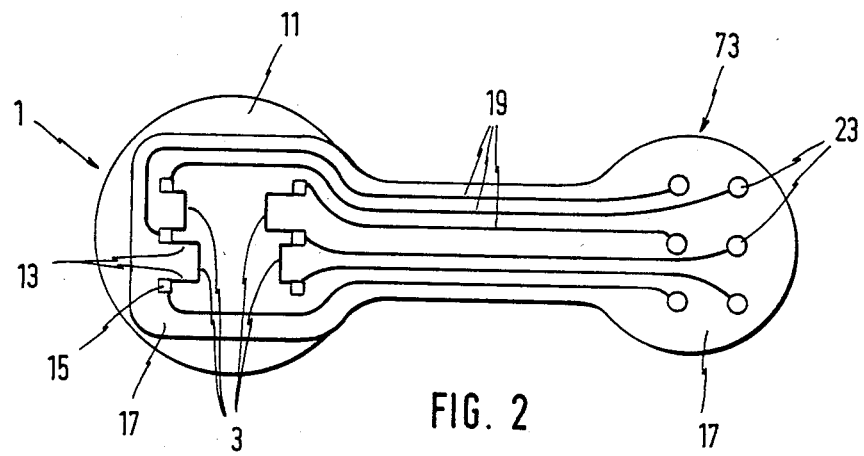

As may be learned from FIG. 2, the resistances 3 on the top measuring membrane 11 are connected with connecting points 15 over conductors 13. The pressure measuring cell 1 is further covered over with a section of plastic foil material, preferentially a section of film 17 on which are applied or installed conductors 19. These conductors 19 are etched out, for example, from a copper coil laminated to the plastic section of film 17.

Figure 3A:
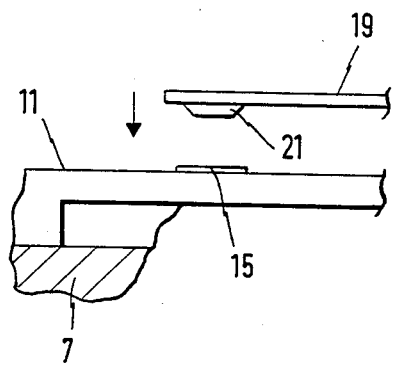
FIGS. 3a and 3b are two schematic, detail illustrations of the contact protuberances.

Joining of the connecting points 15 with the conductors 19 etched out on the section of film 17 can be accomplished, as is shown schematically in FIG. 3a, via contact protuberances 21. As may be learned from FIG. 3b, the contact protuberances 21 are formed out, with appropriate size, on the section of film 17 as a component thereof during the manufacturing process.

This can, for example, be achieved by a photolithographic masking process followed by etching, whereby copper protuberances arise at the ends of the conductors. To produce a good contact, the connecting points 15 can additionally by provided with a gold deposit prior to contacting.

Figure 3B:
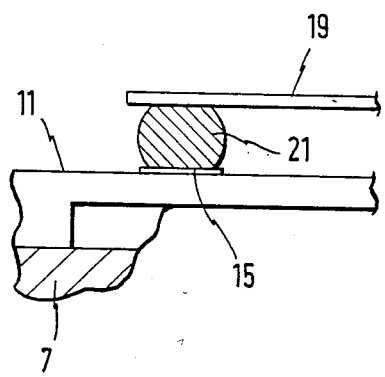

However, basically just as possible also according to FIG. 3b is to build up the contact protuberances 21 on the connecting points 15 of the measuring membrane 11 in order, afterward, to contact, by means of normal contacting processes, the conductors 19 with the connecting points 15 of the measuring membrane 11 via the contact protuberances 21. This wireless mounting (bonding) can, for example, be done by thermocompression or by reflux soldering.

The pressure measuring cell described above with the firmly contacted conductors 19, via the section of film 17, can thus be used by original equipment manufacturers, according to their application requirements, for the most varied of purposes for use. Since the costintensive and expensive wiring contact to the measuring membrane itself is not necessary, for the purpose of selectively obtaining the measured values it is now merely necessary to solder the conductors to the contact eyes 23. However, as is learned in the top plan view according to FIG. 2, the section of film 17, in particular in the area of the contact eyes 23, can be formed in an arbitrary size so that the contact eyes 23 are spaced apart the desired distance so that it becomes possible, by means of usual soldering procedures, to solder the additional sections of conductor mentioned and not shown in greater detail. Since the film withstands, undamaged, for example, temperatures up to at least 300° C., preferentially up to 400° C., and usual soldering temperatures lie, for example, at about 180° C., damaging of the section of film 17 cannot occur.

In the case of the examples of embodiment shown up until now, work has been done in each case starting from the principle with a socalled single layer film. As a rule, however, multiple layer films, for example two or three layer films, are used, which will be explained hereinbelow with reference to FIG. 4.

Figure 4:
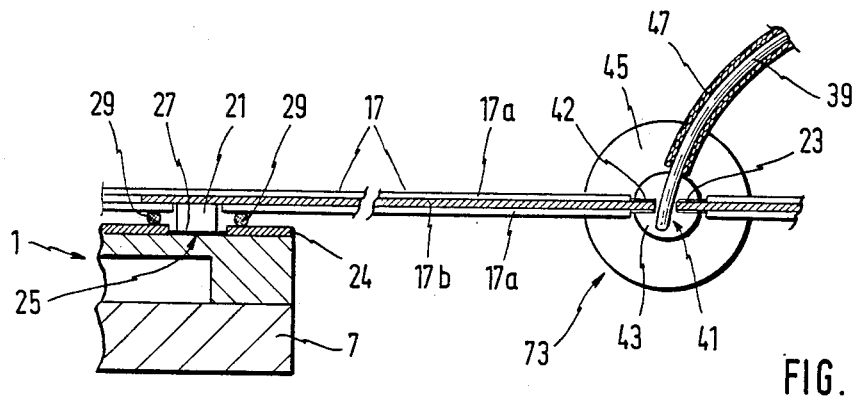
FIG. 4 is a schematic, detail illustration of another example of an embodiment in an axial cross-section.

Shown in FIG. 4, in an excerpt fashion in the axial crosssection, is another pressure measuring cell 1 with a base plate 7. Provided on the top side of the measuring membrane 11 is a glass insulator (SiO$_2$-glass) 24 displaying cutouts 25, beneath which is provided, for example, a layer of aluminum 27 for the connecting points 15. Here, disposed above the measuring membrane 11 is the section of film 17, whereby the line termination of the connecting points 15 is again formed, via the contact protuberances 21, to the conductors formed out in the section of film 17. The section of film 17 is here formed out as a so-called three layer film with two outer insulating layers 17a and a center layer 17b, which consists of several conductors 19 formed by etching. In the area of the contact protuberance 21, the outer insulating layer 17a is removed in order to produce a line termination.

In order to also be able to use the pressure measuring cell directly in the case of conducting media without any other transmitting or transfer membranes, a thin sealing lip 29 is formed out between the section of film 17 and the top side of the measuring membrane 11, about the cutout 25 with the connecting points 15. The sealing lip 29 can here, for example, be of ring or circular configuration. This sealing lip 29 can be sprayed on, for example on the underside of the section of film 17, with a thickness of under 0.4 mm, for example 0.2 mm. By this means, the conductors 19, the contact protuberances 21 and also the aluminum layer 27 at the connecting points 15 can be completely sealed off from the pressure medium. Since the measuring membrane 11, for example, is made of silicon, it is otherwise completely isolated and insulated by the layer of glass placed on its top side.

Figure 5:
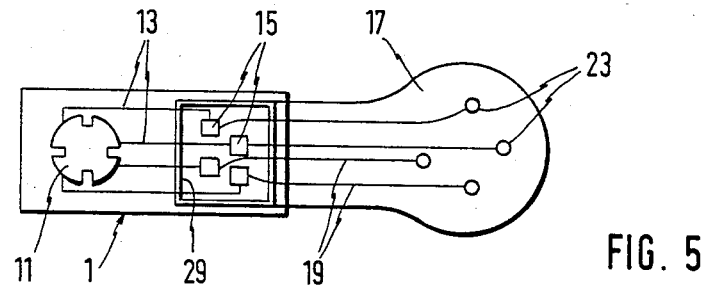
FIG. 5 is another example of an embodiment in a top plan view.

As a departure from FIG. 4, capable of being seen in the example of embodiment according to FIG. 5 is that the sealing lip 29 can be disposed not individually in each case about each connecting point 15, but rather commonly about several connecting points 15 disposed near one another. In the example of the embodiment according to FIG. 5, the pressure measuring cell 1 is shown in a square configuration in top plan view, with the measuring membrane 11 being indicated as disposed to the left. Here, the pressure measuring cell 1 displays a flat top side, with a hollow space being formed out from below in the region of the measuring membrane 11. As is to be seen from the example of this embodiment, the connecting points 15 are disposed asymmetrically, commonly next to one another, on the top side of the pressure measuring cell and joined with the resistances 3 via the conductor 13. In the region of the connecting points 15, the overlying glass insulation is removed so that the section of film 17 with conductors 19 and contact protuberances that are not shown in more detail, can make contact against the connecting points 15. In this case, used for isolating and insulating is a common, essentially square, circumscribing lip 29.

Explained further briefly in the following with the aid of FIG. 4 is the installation of an arbitrary connecting wire 39 to the contact eyes.

As may be seen from FIG. 4, the secton of film 17 is provided, in the region of each contact eye 23, with a central hole 41 through which is pushed one end of a connecting wire 39 with its insulation removed. At this point, the connecting wire 39 can now be soldered in usual fashion to a section 42 where the insulation has been removed, whereby is formed a ball of solder 43. For added insulation, this ball of solder can be sealed off with an insulating adhesive (glue) 45, that extends to over the end of an insulation 47 of a connecting wire 39.

Explained in the following will be a specific field of application for a pressure measuring cell of this type, with the wireless-installed conductors 19 in the section of film 17.

Figure 6:
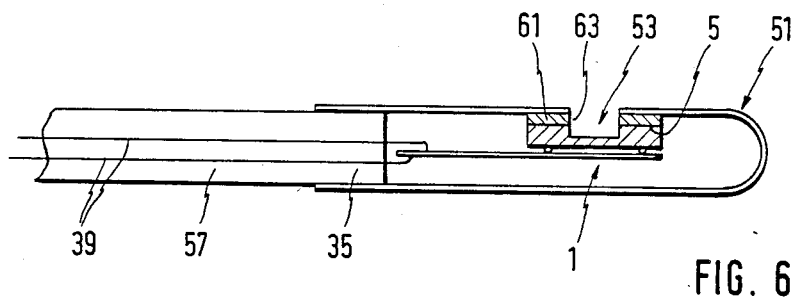
FIGS. 6 and 7 are a pressure measuring cell built into a catheter housing, in an axial view and a cross-sectional view.
Figure 7:
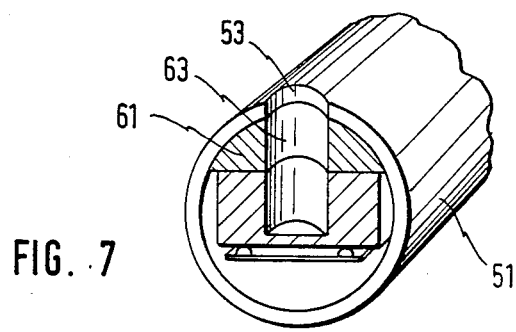

As is apparent from FIGS. 6 and 7, the pressure measuring cell 1 is built into a catheter housing 51 that displays, in principle, a cartridge shape with a window 53. Here, the pressure measuring cell 1 is, for example, firmly glued in via its base foot 5, about the window 53 so that the inner space of the catheter housing 51 is shielded toward the outside. In the example of embodiment shown, used for attaching the pressure measuring cell 1 is an adapter member 61 which, with its top cylindrical jacket corresponding to the internal shape of the catheter housing 51, is firmly glued to this latter. The adapter member 61 is also provided with a boring 63 in extension of the window 53. In this case, on the smooth underside of the adapter member 61, the foot of the pressure measuring cell 1 is preferentially glued on in elastic fashion in order to prevent the transfer of stresses onto the pressure measuring cell.

The mounting of this type of pressure measuring cell 1 with contacting section of film 17 can, for example, easily be done by an original equipment manufacturer in that he may first solder the connecting wires 39 to the contact eyes 23 at the end of the conductor 19, in the section of film 17, running from the pressure measuring cell 1. Next he may push the pressure measuring cell 1 with the section of film 17 and the catheter 57 into the introduction opening 35, and then glue the pressure measuring cell 1, at its base foot 5, about the window 53 and/or the boring 63 in the adapter member 61. Further, the catheter 57 must likewise be glued in the region of the introduction opening 35 of the catheter housing 51.

The pressure measuring cell with the conductors 19 contacting via the section of film 17 in accordance with the invention thus represents the smallest structural unit capable of being produced in extremely simple and inexpensive fashion, without the expensive process of making contact by means of individual wires, and may be used for a wide variety of applications. This cell may be applied, for example, in the construction of a pressure sensor in the automobile industry, such as for immersion purposes, and also, for example, may be applied as an altimeter.

Figure 8:
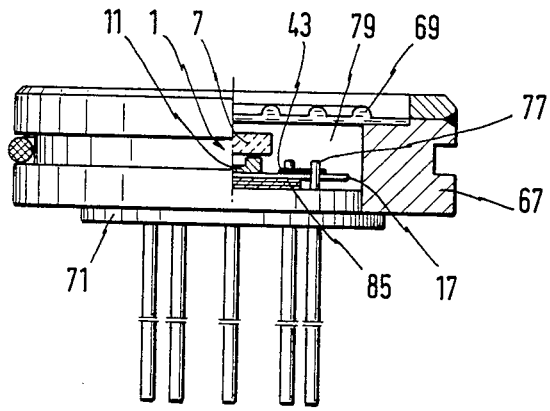
FIG. 8 is another example of an embodiment of a flat pressure measuring cell.

Reference will be made in the following to FIG. 8 in which a particularly ultra flat form of embodiment of the invention is shown.

In this example of embodiment, the pressure measuring cell 1 is built into a cylindrical-like housing 67 with a transmitting membrane 69 being welded on. The housing 67 is closed off via a bottom base 71, in the example of embodiment with a stepped base. The measuring membrane 11 lies almost on the head, disposed freely floating in the housing 67, and held by the flexible section of film 17, which is provided at its connecting region 73 (FIG. 10) with the already mentioned central holes 41 (FIG. 4), with the base pins 75 pushed through such that the ends of the base pins 77 are soldered, via the ball of solder 43, to the side of the section of film 17 on which the measuring membrane 11 is also contacting. Capable of being achieved in this fashion is a paritcularly ultra flat pressure measuring cell, since the lateral pressure space, next to the pressure measuring cell, will be utilized in optimum fashion for the ball of solder 43. Naturally, the pressure measuring cell could also be built in in a usual arrangement with top-lying measuring membrane 11 and base plate 7 attached below, whereby, however, the flexible section of film 17 is then disposed in superimposed fashion. For technical manufacturing reasons, however, it is also desirable in this case that the base pin ends 77 project through the section of film 17 and again likewise being soldered along the top, hence on the side opposite to the base 71, for which reason then an additional structural space, up to the transfer or transmitting membrane, is stressed. In this case, capable of being produced is a not quite so ultra flat pressure measuring element.

Figure 9:
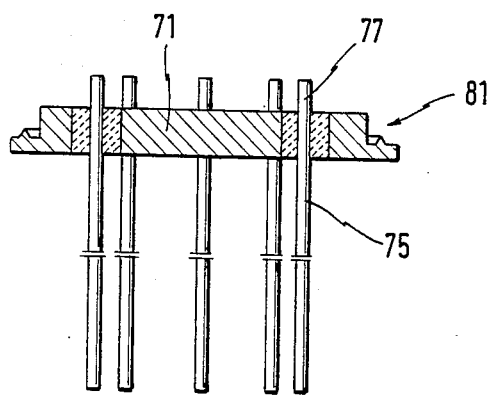
FIG. 9 is a schematic side view of the stepped base used in FIG. 8.

The flat structure of the pressure measuring element mentioned also becomes possible, however, in simple fashion by constructing the housing and/or the base without any bored filler hole. Accordingly the pressure measuring element, after completion of filling for example with oil, is closed up inside the inner pressure space 79 by the step-shaped constructed base 71 previously mentioned, and is resistance welded in the filled condition. Additionally, the base—as is obtained in particular from FIG. 9—is provided with a circumferential resistance ring 81. After placement of the resistance ring 81 on the underside of the cylindrically-shaped housing 67, laid in between housing and base are the two electrodes, so that resistance welding can follow via the resistance ring 81.

With appropriate contacting pressure, the resistance ring 81 is extensively deformed, respectively enlarged, so that a firm seating of the base on the housing is assured over a broader section of base 71.

Figure 10:
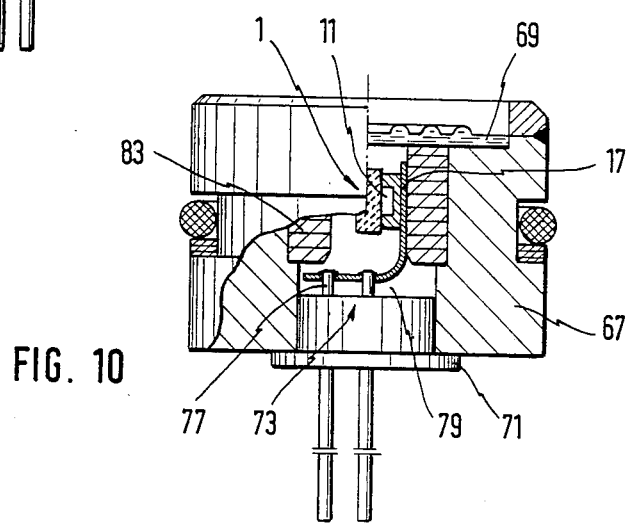
FIG. 10 is another example of an embodiment of a pressure measuring element with a particularly small diameter.

Finally, reference is further made to FIG. 10 in which, in comparison to FIG. 8, shown is a pressure measuring element with a particularly small diameter. In this form of embodiment, the connection area 73 of the flexible section of film 17 likewise lies parallel to the base 71, whereby the base pin ends 77 in turn project through the section of film 17 at central holes 41 and are soldered overhead. However, with this form of embodiment, the elastic section of film 17, next to the connection region 73, is bent upwardly by about 90°, so that the pressure measuring cell 1 lies in a vertical position with the measuring membrane 11 directed perpendicularly to the base 71. The elastic section of film 17 can be maintained in a desired position by a tubing stub 83 located internally. Hence, here also, the pressure measuring cell is disposed in floating fashion inside the inner pressure space 79.

This form of embodiment can also be constructed without a filling bore hole in the housing body and/or in the base, and the base 71, after filling of the inner pressure space 79 with pressure medium, is resistance welded with the underside of the housing 67 via the resistance ring 81 that was mentioned.

Finally, it should again be pointed out that, as an example as is shown in FIG. 8—it is possible to dispose between the pressure measuring cell 1 and the base 71 an insulating disc 85 on the base.

The insulating disc 85 shown in FIG. 8 additionally serves such that, during soldering to the base pin ends 77, no short circuits are capable of being formed with the base 71 and, therewith, with the housing 67. The importance further lies also in the fact that whenever the interval between the resistances on the pressure measuring cell 1 and the base 71 of the housing 67 is very small, very high field strengths can be generated with the occurrence of differences in potential, which could influence the stability of the resistance. The insulating plate 85 therefore makes the distance to the base greater.

In the example of embodiment according to FIG. 10, the referenced tubing stub 83 is assigned the function of reducing the volume inside the inner pressure space 79 and also to maintain the interval between the housing 67 and the pressure measuring cell 1 above a critical dimension.

Deviating from the example of embodiment shown in accordance with FIG. 8, it is naturally also possible to build in a usual type pressure measuring cell with top-lying measuring membrane, that is glued or in general fastened by its base plate 7 to an insulating disc 85 or directly to the base 71 located thereunder, and forming a connection in usual fashion with gold wires running from the measuring membrane to the base ends 77. Even if in so doing a not quite so optimal ultra flat structure is to be obtained as in the example of embodiment according to FIG. 8, this result can nevertheless be approximately obtained if, here also, a bore hole-free filling of the inner pressure space 79 is undertaken by resistance welding of the base 71 that is shown with the surrounding ring 81.

The piezoresistive pressure sensors or transducers shown, particularly in the last examples of embodiments in the ultra flat construction, are readily adapted as immersion tubes, which in accordance with the invention can be constructed so narrow and flat that their dimensions and height are no greater than that of customary type wrist watches.

I claim:

1. In a piezoresistive pressure measuring cell having a measuring membrane provided with resistance elements having electrical contact points thereon, and with conductors extending from the electrical contact points of the measuring membrane, said pressure measuring cell being characterized in that:
   said conductors are disposed on a flexible plastic film and have opposed first and second ends;
   the first of said conductor ends have a plurality of contact protuberances disposed thereon;
   said conductors are electrically coupled to said resistance element contact points through said contact protuberances;
   said second conductor ends are provided with solderable contact eyes; and
   said film is provided with a central hole in the region of each contact eye, at least one surface of said contact eye being exposed whereby the end portion of an interconnecting wire may be received within said central hole.

2. The piezoresistive pressure measuring cell in accordance with claim 1 being particularly characterized in that said conductors are etched copper foil laminated to a flexible substrate.

3. The piezoresistive pressure measuring cell as defined in claim 2 being particularly characterized in that the spacing between said contact eyes is greater than the inter-conductor spacing of said etched copper foil.

4. The piezoresistive pressure measuring cell as defined in claim 1 being particularly characterized in that said plastic film upon which the conductors are disposed is nodular-shaped with enlarged end section.

5. The piezoresistive pressure measuring cell as defined in claim 1 being particularly characterized in that said plastic film is capable of withstanding temperatures up to 400° C.

6. The piezoresistive pressure measuring cell as defined in claim 1 being particularly characterized in that said conductors comprise a conductive layer of a multilayer film having an outside insulative layer, a portion of said insulative layer being removed in the region of said contact protuberances.

7. The piezoresistive pressure measuring cell as defined in claim 1 being particularly characterized to include a sealing lip between said flexible plastic film and said measuring membrane and surrounding said protuberances.

8. The piezoresistive pressure measuring cell as defined in claim 7 being particularly characterized in that said sealing lip is ring-shaped and applied onto the surface of said plastic film by spraying.

9. The piezoresistive pressure measuring cell as defined in claim 7 being particularly characterized in that said sealing lip has a thickness less than approximately 0.4 mm.

10. The piezoresistive pressure measuring cell as defined in claim 1 being particularly characterized in that said protuberances are surrounded by a single sealing lip.

11. The piezoresistive pressure measuring cell as defined in claim 1 being particularly characterized in that said pressure measuring cell is provided with an exterior surface, and wherein a sealing lip is disposed between the surface of said plastic film and the exterior surface of said cell.

12. The piezoresistive pressure measuring cell as defined in claim 7 being particularly characterized in that said pressure measuring cell is provided with a glass insulator having a bore formed therein, and wherein said sealing lip circumscribes said bore.

13. The piezoresistive pressure measuring cell as defined in claim 1 being particularly characterized in that an electrically insulative adhesive film is disposed radially outwardly of said central hole and in spaced relationship thereto.

14. The piezoresistive pressure measuring cell as defined in claim 1 being particularly characterized in that said pressure measuring cell is disposed within an elongated catheter housing so as to form a combination for invasive blood pressure measurements; said combination being characterized in that:
 (a) a bore is formed in said catheter housing to form a window adjacent a distal end thereof, and wherein said pressure measuring cell is mounted immediately adjacent to said window; and
 (b) said flexible plastic film and conductors disposed theroen project proximally from said window.

15. The piezoresistive pressure measuring cell as defined in claim 14 being particularly characterized in that an adapter member is disposed along the inner surface of said catheter housing circumscribing said window to receive said pressure measuring cell thereagainst.

16. The piezoresistive pressure measuring cell as defined in claim 1 being particularly characterized in that means are provided to receive active and passive circuit elements on the surface of said plastic film.

17. The piezoresistive pressure measuring cell as defined in claim 1 being particularly characterized in that said measuring cell is mounted within a closed housing formed by a pressure transferring membrane and a rigid base so as to provide a hermetically sealed enclosure, said pressure measuring cell being supported by said plastic film in floating fashion.

18. The piezoresistive pressure measuring cell as defined in claim 17 being particularly characterized in that rigid base pins extend through said base, and wherein said pressure measuring cell is supported by said film in spaced relationship over said base pins, and wherein said conductors are electrically soldered to said base pins.

19. The piezoresistive pressure measuring cell as defined in claim 18 being particularly characterized in that said plastic film and conductors are mounted onto said base pins through bores formed in said plastic film and conductors.

20. The piezoresistive pressure measuring cell as defined in claim 17 being particularly characterized in that said pressure measuring cell is arranged in superimposed spaced relationship to said base.

21. The piezoresistive pressure measuring cell as defined in claim 17 being particularly characterized in that said pressure measuring cell lies perpendicularly to and in spaced relationship to said rigid base and wherein said plastic film is provided with a right-angular bend along the length thereof.

22. The piezoresistive pressure measuring cell as defined in claim 21 being particularly characterized in that the section of plastic film having the bend therein is supported within the confines of a tubular sleeve, and wherein said tubular sleeve is disposed substantially coaxially with said housing.

23. The piezoresistive pressure measuring cell as defined in claim 17 being particularly characterized in that said housing and base are constructed so as to provide a hermetically sealed enclosure, and with said enclosure being oil-filled.

24. The piezoresistive pressure measuring cell as defined in claim 17 being particularly characterized in that an insulating disc means is mounted upon the base between said base and said measuring cell.

* * * * *